United States Patent [19]

Argabrite

[11] 4,121,463
[45] Oct. 24, 1978

[54] PROBE SURFACE THERMOMETER

[75] Inventor: George A. Argabrite, Malibu, Calif.

[73] Assignee: Pacific Transducer Corporation, Los Angeles, Calif.

[21] Appl. No.: 771,611

[22] Filed: Feb. 22, 1977

[51] Int. Cl.² .......................................... G01K 5/62
[52] U.S. Cl. .................................................. 73/363.7
[58] Field of Search ................. 73/362.8, 363.5, 363.7, 73/363.9

[56] References Cited

U.S. PATENT DOCUMENTS

| | | | |
|---|---|---|---|
| 1,575,262 | 3/1926 | Greiner, Jr. | 73/374 |
| 1,991,553 | 2/1935 | Hastings | 73/363.7 X |
| 2,678,379 | 5/1954 | Fry | 73/363.5 X |
| 2,960,270 | 11/1960 | Long, Jr. | 73/363.7 X |
| 3,460,389 | 8/1969 | Lamb | 73/363.7 |
| 3,745,828 | 7/1973 | Howell | 73/359 X |

FOREIGN PATENT DOCUMENTS 67,015 11/1943 Norway ................................. 73/363.7

Primary Examiner—Richard C. Queisser
Assistant Examiner—Joseph W. Roskos
Attorney, Agent, or Firm—Poms, Smith, Lande & Glenny

[57] ABSTRACT

A thermometer for measuring a surface temperature having in its lower portion a spiral bimetallic strip mounted centrally on the lower end of a spindle whose upper end carries an indicating pointer. The spindle is journaled in an elongated tubular stem carrying at its upper end a dial face bearing angularly spaced indicia with which the pointer cooperates for indicating temperature. The lower end of the stem has fixed thereto a cup-shaped shield, downwardly open, surrounding the bimetallic strip, and including means restraining angular movement of the outer end of the bimetallic strip, but permitting limited axial movement of the strip and spindle relative to the stem and shield.

1 Claim, 5 Drawing Figures

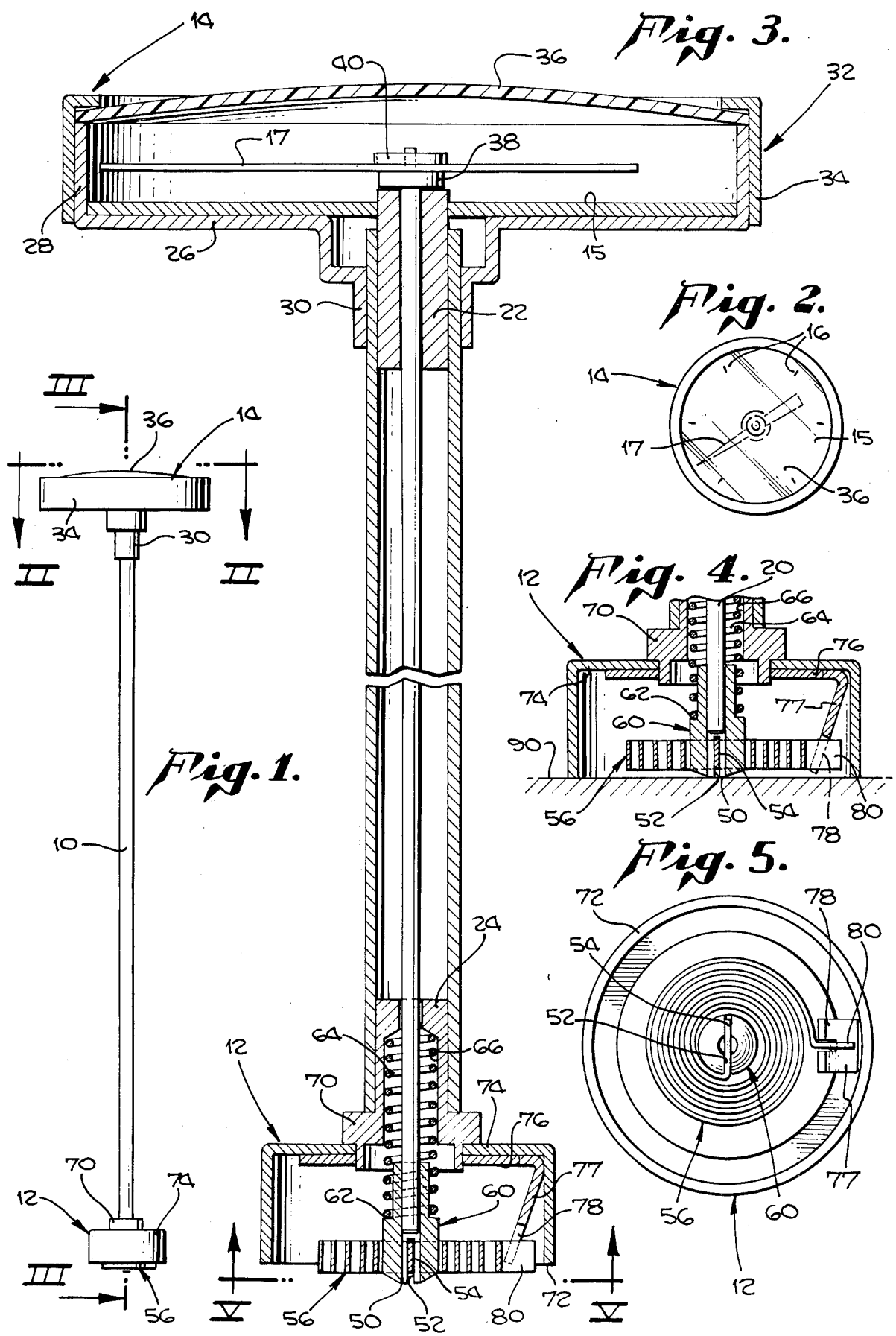

PROBE SURFACE THERMOMETER

BACKGROUND AND SUMMARY OF THE INVENTION

The present invention relates generally to temperature measuring devices, and more particularly to such a device for measuring the temperature of a surface, the device being in the form of a probe so that the indicating portion of the meter is substantially spaced away from the workpiece or sample whose temperature is being measured.

In the preferred form of the invention hereinafter described and illustrated, there is provided a body comprising an elongated tubular stem in which an elongated spindle is concentrically mounted and rotatably journaled. The lower end of the spindle has fixed thereto the central portion of a spiral bimetallic strip, the lowermost end of the spindle constituting a tip spaced slightly below the lower edge of the spiral strip. The outermost turn of the strip is provided with an outwardly extending tab, and means are provided for restraining angular movement of the tab relative to the stem, while permitting limited axial movement of the tab relative to the stem. The upper end of the spindle carries thereon an indicating pointer, which visually cooperates in indicating temperature with a dial fixed to the upper end of the stem. Resilient means may be provided for biasing the spindle and the parts carried thereby downwardly relative to the stem, as well as means for limiting that downward movement. The lower end of the stem desirably has fixed thereto a downwardly open cup-shaped shield surrounding the bimetallic strip. In the rest position of the parts, the lowermost end of the spindle extends slightly below the lower edge of the cup-shaped shield, as does also the lowermost edge of the spiral strip. In measuring the temperature of a sample, the lowermost tip of the spindle is placed on the sample, and the user, grasping the instrument at the upper end of the stem, moves the stem and parts carried thereby slightly downwardly or toward the sample until the lower edge of the shield contacts the sample.

Accordingly, it is a principal object of the present invention to provide and disclose a novel surface thermometer including an elongated stem so that the user's fingers, grasping the stem, are substantially spaced from the sample and thereby protected from being harmed by the heat of the sample. Other objects and purposes are to provide, in such a thermometer, a spiral bimetallic strip carried on the lower end of a spindle rotatably mounted in the elongated tubular stem and permitted slight axial movement relative to the stem; to provide such a device having a lower cup-shaped shield for partially surrounding the spiral bimetallic strip for protecting the same; to provide in such a device resilient means for biasing the spindle and the parts carried thereby downwardly relative to the tubular stem, and means limiting such downward movement; and for other and additional objects as will be understood from the following description of the preferred embodiment of the invention, taken in connection with the accompanying drawing.

BRIEF DESCRIPTION OF THE DRAWING

FIG. 1 is a side elevational view of a thermometer in accordance with the present invention.

FIG. 2 is a top plan view, looking downwardly on the arrows II—II of FIG. 1.

FIG. 3 is a vertical sectional view taken on the arrows III—III of FIG. 1.

FIG. 4 is a fragmentary sectional view of the lower portion of the device in actual use in measuring the temperature of a sample.

FIG. 5 is a bottom plan view of the device, looking upwardly on the arrows V—V of FIG. 3.

DETAILED DESCRIPTION

As appears in FIG. 1, the thermometer of the present invention includes an elongated stem indicated generally at 10 carrying at its lower end an enlarged hollow cup-shaped shield indicated generally at 12, and at its upper end an enlarged head indicated generally at 14. As seen in FIG. 2, head 14 includes a circular dial 15 bearing thereon angularly spaced indicia 16, and a centrally supported indicating pointer 17 indicates temperature in cooperation with the indicia 16 in conventional manner.

Referring to FIG. 3, stem 10 is seen as being tubular, having concentrically mounted therein a spindle 20 which is rotatably journaled in an upper bearing 22 and a lower bearing 24, the latter being fixed to the inner wall of stem 10. Upper head 14 includes a cup-shaped annular plate 26 having an integrally formed annular sidewall 28 and a downwardly projecting annular portion 30 fixed to the outer wall of stem 10. On the upper surface of plate 26 is mounted dial 15 previously mentioned, and an annular cover indicated generally at 32 includes a sidewall 34 in snug fit outwardly of wall 28 of plate 26, and serves to retain in place an upwardly convex transparent cover plate 36.

Spindle 20 carries at its upper end a fitting 38 slidably supported on the upper end of bearing 22 and, in cooperation with an upper fitting 40, carries indicating pointer 17 previously mentioned.

The lower end of spindle 20 terminates in a lowermost smooth tip 50 which is desirably provided with a central recess 52 in which is received the inner straight end 54 of a spiral bimetallic strip indicated generally at 56, the flat end 54 being retained in recess 52 by suitable means such as brazing or the like.

The lower end of spindle 20 has fixed thereto a tubular fitting indicated generally at 60 provided with an upwardly facing annular shoulder 62 against which downwardly abuts resilient means in the form of a helical spring 64. The upper end of spring 64 is received in a counterbore 66 formed in the lower bearing 24. Thus spindle 20 and the parts carried thereby including spiral bimetallic strip 56 are resiliently biased downwardly relative to stem 10, and the lower limit of downward movement of spindle 20 is determined by abutment of fitting 38, at the upper end of spindle 20, against the upper annular face of upper bearing 22.

The lower end of lower bearing 24 includes an enlarged portion 70, to which is fixed the shield 12 previously mentioned, which is a downwardly open cup-shaped structure generally surrounding bimetallic strip 56 and the lower portion of spindle 20. Shield 12 includes a lowermost annular wall 72 lying in a plane which, when the parts are in their rest position seen in FIG. 3, is slightly above the plane of the lower edge of spiral strip 56.

The upper wall 74 of shield 12 has fixed to its lower face a metallic member 76 including, in its right side as seen in FIG. 3, a downwardly and inwardly inclined arm 77 terminating downwardly in a bifurcated portion 78 including a pair of arms for slidably receiving therebetween a flat outwardly projecting tab 80 of bimetallic strip 56, thereby permitting a certain amount of axial movement of spindle 20 and strip 56 carried thereby, relative to stem 10 and shield 12 fixed thereto.

In operation, as seen in FIG. 4, the lowermost tip 50 of spindle 20 is placed in contact with a sample indicated generally at 90 whose temperature is to be measured, and the user, grasping the outside of stem 10, or of head 14, presses slightly downwardly until the spindle 20 and parts carried thereby, including bimetallic strip 56, are retracted upwardly into the positions seen in FIG. 4, against the relatively light biasing force of spring 64. It may be noted that the lowermost edge of bimetallic strip 56 is spaced slightly above the surface of sample 90, the spacing in FIG. 4 being somewhat exaggerated for clarity of illustration. Keeping in mind that the outer tab 80 of strip 56 is prevented from angular movement by its relationship with arms 78 of the bifurcated member 77, it will be seen that the temperature of sample 90 will cause, through bimetallic strip 56, rotation of the inner end 54 of the strip, and thereby rotation of spindle 20 and of indicating pointer 17 carried at the upper end of the spindle. The amount of rotation, in accordance with well known principles of bimetallic strip thermometers, will produce a reading which is a function of the temperature of sample 90. It will be particularly noted that the smoothness of lower tip 50, in conjunction with the very light downward force imposed by spring 64, will minimize the frictional drag resisting rotation of spindle 20, so that accuracy of reading is not substantially impaired.

Modifications and changes from the preferred form of the invention hereinabove described and illustrated are within the contemplation of the invention, and are intended to be embraced within the scope of the appended claims.

I claim:

1. In a surface thermometer, in combination:

a body comprising an elongated tubular stem;

a dial plate fixed concentrically to the upper end of the stem and bearing thereon temperature indicia;

a spindle rotatably and axially movably mounted in the stem having fixed to its upper end a pointer spaced above the dial plate and provided with a smooth lower tip for contacting the surface of a sample;

resilient means urging the spindle downwardly relative to the stem;

means for limiting downward axial movement of the spindle relative to the stem;

a downwardly open rigid cup-shaped shield fixed to the lower end of the stem and having a lower annular edge lying in a plane normal to the spindle axis; and a temperature sensitive bimetallic spiral strip having its inner end fixed to the lower end of the spindle and its outer end contacting the shield for movement relative thereto only axially of the spindle, the strip having a lower edge lying in a plane perpendicular to said axis and slightly above the tip and normally below the plane of the annular edge, the strip being retracted into the shield against the force of the resilient means when the tip and the annular edge are pressed into contact with a sample.

* * * * *